United States Patent [19]
Smith

[11] Patent Number: 5,706,151
[45] Date of Patent: Jan. 6, 1998

[54] LOW BIAS CURRENT PAIRED MAGNETORESISTIVE HEAD WITH MISALIGNED ANISOTROPY AXES

[75] Inventor: Neil Smith, San Diego, Calif.

[73] Assignee: Eastman Kodak Company, Rochester, N.Y.

[21] Appl. No.: 760,087

[22] Filed: Dec. 12, 1996

[51] Int. Cl.$^6$ ..................................................... G11B 5/39
[52] U.S. Cl. ..................................................... 360/113
[58] Field of Search .......................... 360/113; 324/252; 338/32 R

[56] References Cited

U.S. PATENT DOCUMENTS

| | | | |
|---|---|---|---|
| 3,860,965 | 1/1975 | Voegeli | 360/113 |
| 5,084,794 | 1/1992 | Smith | 360/113 |
| 5,193,038 | 3/1993 | Smith | 360/113 |
| 5,309,305 | 5/1994 | Nepela et al. | 360/113 |
| 5,357,388 | 10/1994 | Smith | 360/113 |
| 5,485,333 | 1/1996 | Yang et al. | 360/113 |
| 5,508,868 | 4/1996 | Cheng et al. | 360/113 |
| 5,535,077 | 7/1996 | Saito et al. | 360/113 |
| 5,576,915 | 11/1996 | Akiyama et al. | 360/113 |
| 5,663,770 | 9/1997 | Che | 360/113 |

Primary Examiner—Robert S. Tupper
Attorney, Agent, or Firm—William F. Noval

[57] ABSTRACT

A magnetoresistive head assembly comprising:

a paired magnetoresistive head including first and second magnetoresistive elements, and having a first electrically insulating spacer located between the elements;

the first and second magnetoresistive elements being of nominally identical thickness, geometry, magnetic and electrical properties, with the exception that easy-axis of uniaxial anisotropy (excluding shape anisotropy) of the first MR element, is oriented at a first, substantially nonzero angle with respect to the geometrically defined longitudinal axis of the MR elements, and is substantially nonparallel to the easy-axis of uniaxial anisotropy (excluding shape anisotropy) of the second MR element, the easy-axis of uniaxial anisotropy of the second MR element being oriented at a second, substantially nonzero angle with respect to the geometrically defined longitudinal axis of the MR elements;

means for making electrical contact to, and supplying a parallel bias current of nominally equal amplitude through both of the MR elements; and means for sensing the difference in voltage across the first and second MR elements.

2 Claims, 7 Drawing Sheets

LOW BIAS CURRENT PAIRED MAGNETORESISTIVE HEAD WITH MISALIGNED ANISOTROPY AXES

FIELD OF THE INVENTION

This invention relates in general to a head for sensing magnetic fields and relates more particularly to a paired magnetoresistive element (PMR) head which is particularly designed for self-biased operation with minimized power and bias current consumption in wide trackwidth applications.

BACKGROUND OF THE INVENTION

Figure 1A:
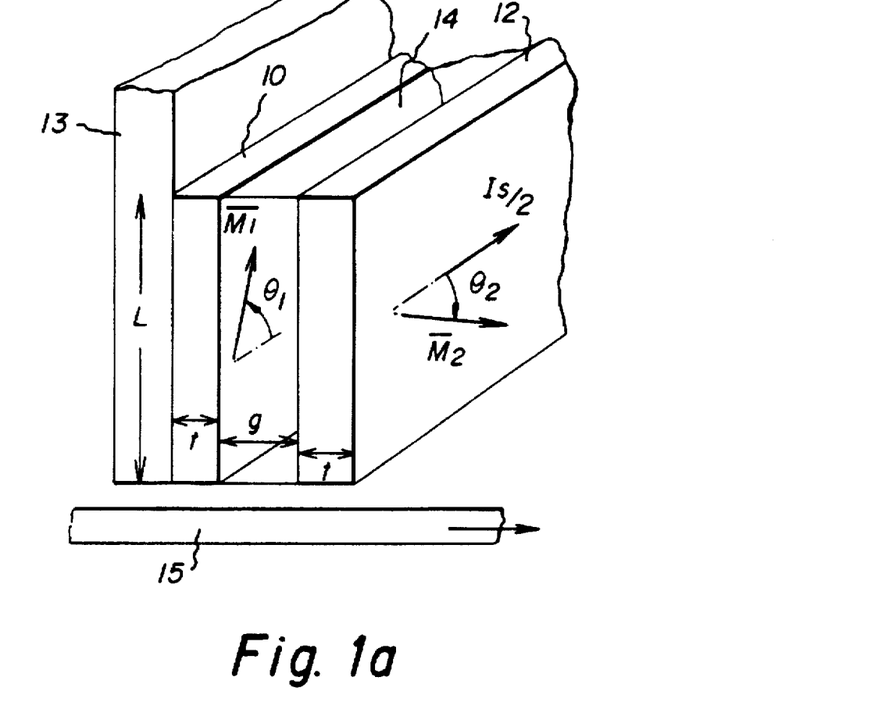
FIGS. 1a and 1b are respective partial side and front, perspective views of a conventional PMR head.
Figure 1B:
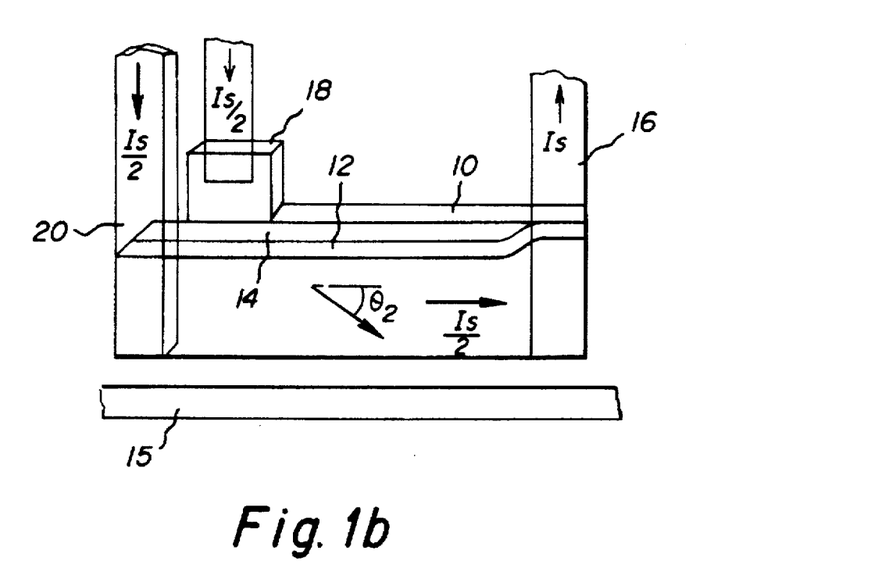

As illustrated in FIGS. 1a and 1b, a conventional paired magnetoresistive element (PMR) head (such as disclosed in U.S. Pat. No. 3,860,965), includes a matched pair of magnetoresistive (MR) elements 10,12 (e.g., NiFe) deposited side-by-side adjacent to each other on a substrate 13, separated by a thin insulating gap-spacer material 14. The PMR head interfaces with a magnetic medium 15. One end of each MR element 10,12 may be electrically shorted to the other element (FIG. 1b), forming a three-terminal device with one terminal 16 common to both MR elements 10,12 and two other terminals 18,20 at the other ends of elements 10,12 supplied current I/2. For this PMR sensor, the sense currents in elements 10,12 flow in parallel, toward or from the common terminal 16. Such a PMR sensor is self-biased, in that the magnetic fields from the currents in each MR element 10,12 provide a transverse biasing field on the other element. These current fields and the resultant PMR bias are antisymmetrical, i.e., of equal magnitude but of opposite polarity in the two MR elements 10,12. Thus, their individual changes in resistance in response to a common mode (uniform) signal field are also opposite in polarity.

If the voltage at the two unconnected terminals 18,20 of the PMR sensor is sensed differentially, the individual voltage changes due to the magnetic signal will add together. In contrast, even-order nonlinear distortion in the readback signal, as well as false signals generated from resistance changes arising from fluctuations in the common temperature of elements 10,12, will be canceled out by the differential detection. Such temperature fluctuations can occur from intermittent head-medium contact and/or frictional heating from asperities in the medium. The thermally induced resistance changes can be particularly large for in-contact recording (e.g., tape or debit card reader head), which is why the PMR design is perhaps best suited to these applications. To protect the PMR elements from corrosion and possible electrical shorting, e.g., due to mechanical damage from in-contact rubbing against an abrasive medium and/or electrochemical processes at the head-medium interface, one can recess the PMR from the head-medium interface and employ additional magnetic layers of high permeability material, of which at least one can be in intimate contact with the magnetic storage medium, to act as a flux-guides to conduct the signal flux from the medium to and through the now environmentally protected PMR head.

Figure 2:
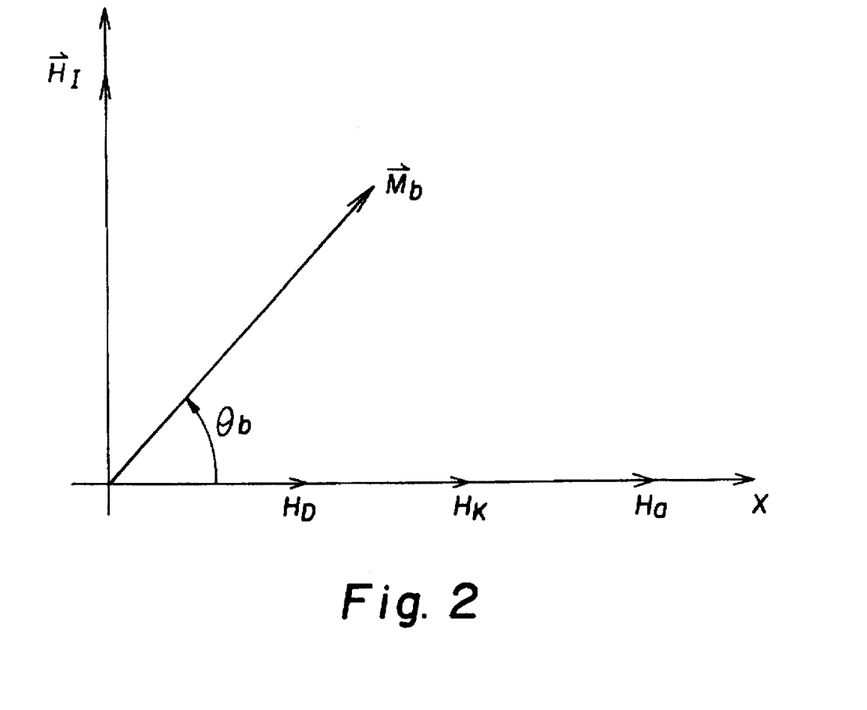
FIG. 2 is a graphical depiction of the magnetics of the self-biasing of a conventional PMR head.

The magnetics of the bias process for a conventional PMR is described graphically in FIG. 2, which represents one of the constituent MR elements. Here, x and y-axes represent, respectively, the longitudinal and transverse directions with respect to the geometry of the MR element. As is well known in the art, deposition of NiFe MR films in the presence of a magnetic field results in an intrinsic, uniaxial, "induced" anisotropy in the film, with easy axis of magnetization parallel to that of the deposition field. For the conventional PMR design known in the art, the induced easy-axis is purposefully aligned longitudinal to the MR elements. For NiFe, the induced anisotropy field strength, $H_k$, is typically 3–5 Oe. There is also, for the PMR element, an additional "shape" anisotropy, with longitudinal easy-axis, that physically arises from the geometry-dependent, combined demagnetizing fields of the two MR elements. For the antisymmetric, self-bias state of the PMR, these demagnetizing fields mostly cancel out. Nonetheless, there still remains a residual shape anisotropy, of (demagnetizing) field strength $H_D \simeq (4tg/L^2)B_s$, where $B_s$=saturation flux density, t=MR element thickness, g=insulating spacer thickness, and L=transverse width of the MR elements. For the conventional PMR, the net anisotropy field $H_a = H_k + H_D$. The transversely oriented, sense current bias field strength $H_I \simeq (\pi/10)I/L$ (I in amps, L in cm, $H_I$ in Oe), where I is the total sense current in both elements. The current field $H_I$ causes the magnetization of the MR elements to rotate by angles $\pm\theta$ with respect to the x-axis, where $\sin\theta = H_I/H_a$. (More accurately, $\theta$ is the maximum magnetization angle at or near the center of the MR element width.) Optimal performance of the PMR is roughly achieved at a nominal bias angle $\theta_b \approx 60°$, which combines high, small-signal sensitivity with good linear dynamic range. The optimal bias current is approximately $I_b \approx (5\sqrt{3}/\pi)L(H_k+4tgB_s/L^2)$.

There exist a variety of applications for PMR heads where low voltage operation, at low current consumption is important. One particular example is low cost battery operation, where after including all electronics, supply voltage available for the PMR head, will in practice be limited to only a few (2–3) volts. For the PMR design, one generally desires to choose both MR and insulation thicknesses t and g to be as small as possible within the limits of high-yield, robust element-element thickness matching and insulation reliability. Typical values might be t=0.025 μm and g=0.15 μm. The remaining parameter to be optimized for low current consumption is the element width, L. Minimization of sense current $I_b$ yields the optimum, $L_{op} = (4tgB_s/H_k)^{1/2}$, corresponding to $H_D = H_k$. Using typical NiFe values $B_s = 10$ kG, $H_k = 4$ Oe, and the previous values for t and g, one estimates $L_{op} \simeq 6$ μm. This value for $L_{op}$ physically large enough for straightforward photolithographic fabrication, as well as for incorporation into the flux-guided PMR design, yet not excessively large where signal resolution and/or sensitivity of the PMR would be very negatively impacted in moderately low linear recording density applications (e.g., a debit card reader). For $L_{op}=6$ μm, one estimates $I_{b-min} \simeq 13$ mA. For long term battery operation, this level of sense current for one PMR head is perhaps acceptably, but not comfortably small. However, for multi-track heads, the cost in sense current would be similarly multiplied.

Another potentially serious difficulty is likely to be sense voltage constraints in applications with sufficiently wide trackwidth, W. For typical thin-film NiFe resistivity, $\rho = 25\mu\Omega$–cm, the element resistance-per-trackwidth R/W=$\rho/(tL_{op}) \simeq 17$ kΩ/cm, requiring a sense voltage of $\frac{1}{2}I_{b-min}R/W \simeq 110$ V/cm. In the case a debit card reader, with typical read trackwidth of 0.1 cm, one would require a PMR bias voltage $V_b \simeq 11$ V, which is four to five times what might be available in low cost battery-operated electronics. Since $V_b \propto I_b/L \propto (H_k+4tgB_s/L^2)$, increasing L>>$L_{op}$ could at best reduce the required $V_b$ by only a factor of two, but with $I_b$ eventually becoming prohibitively large. The other alternative, operation at sub-bias voltage V<<$V_b$ (where $V_b \sim \theta \approx 60°$), would decrease the relative PMR output signal quadratically as $(V/V_b)^2$, which in many applications would not be an acceptable compromise.

SUMMARY OF THE INVENTION

According to the present invention there is provided a solution to the aforementioned problems of the prior art. According to an aspect of the present invention, there is provided a magnetoresistive head assembly comprising:

a paired magnetoresistive head including first and second magnetoresistive elements, and having a first electrically insulating spacer located between the elements;

the first and second magnetoresistive elements being of nominally identical thickness, geometry, magnetic and electrical properties, with the exception that easy-axis of uniaxial anisotropy (excluding shape anisotropy) of the first MR element, is oriented at a first, substantially nonzero angle with respect to the geometrically defined longitudinal axis of the MR elements, and is substantially nonparallel to the easy-axis of uniaxial anisotropy (excluding shape anisotropy) of the second MR element, the easy-axis of uniaxial anisotropy of the second MR element being oriented at a second, substantially nonzero angle with respect to the geometrically defined longitudinal axis of the MR elements;

means for making electrical contact to, and supplying a parallel bias current of nominally equal amplitude through both of the MR elements; and means for sensing the difference in voltage across the first and second MR elements.

ADVANTAGEOUS EFFECT OF THE INVETNION

The present invention provides a PMR head for which optimal self-bias can be achieved at substantially lower sense currents and/or voltages than required of comparable PMR heads of the prior art. This is achieved by a judicious choice of both head geometry, and the directional orientation of the induced anisotropy axes in the two constituent MR elements. The benefits of the PMR head, including high sensitivity, increased linearity, and rejection of thermal-induced noise, are fully retained with the present invention.

DESCRIPTION OF THE PREFERRED EMBODIMENTS

Figure 3:
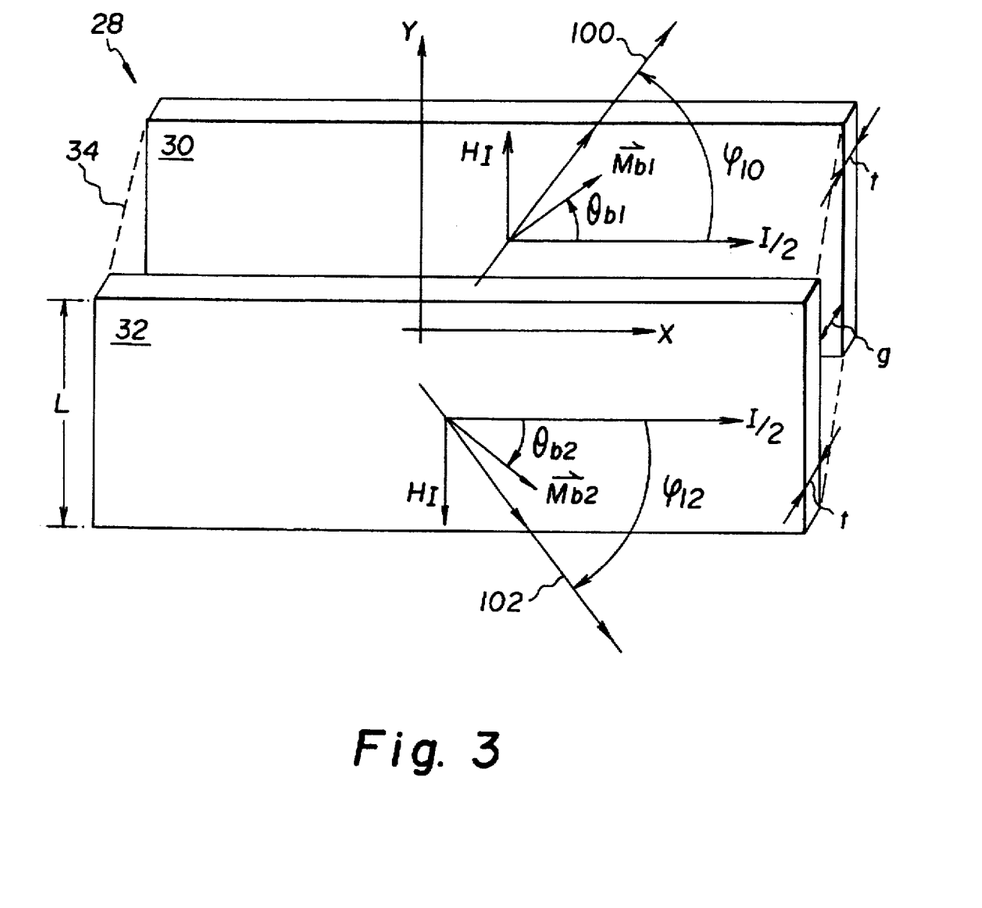
FIG. 3 is a simplified pictorial representation of a PMR element according to the present invention, showing the MR elements, and associated variables describing the bias state.

FIG. 3 shows a pictorial representation of a PMR element which embodies the present invention. As shown, PMR head 28 includes MR elements 30 and 32 separatedby insulating spacer 34. Elements 30 and 32 are electrically connected as shown in FIG. 1. The distinguishing feature of the invention of FIG. 3 over the PMR of FIG. 1 is the deliberate misalignment, by angles $\phi_1 > 0$ and $\phi_2 < 0$ with respect to the longitudinal, of the induced, uniaxial anisotropy easy-axes 100,102 of MR elements 30 and 32, respectively. This could be accomplished as follows: After deposition of MR film 30 and insulating spacer 34, the device wafer is removed from the deposition system and subjected to at least one thermal annealing cycle, e.g., at 250°–300° C. for several hours in a magnetic field parallel to that present during deposition of MR film 30. This is done to stabilize the magnitude and direction of the induced anisotropy of MR film 30 from possible reorientation during the subsequent deposition of MR film 32. The insulation layer 34 would also serve to pacify the MR film 30 during this thermal annealing. The device wafer is then returned to the deposition system, now reorientated by relative angle $\phi_1 - \phi_2$ with respect to the deposition field source, for depositing MR film 32. Prior to the photolithographic patterning of MR films 30 and 32 into their final geometry as MR elements 30 and 32 pictured in FIG. 3, one may additionally stabilize the induced anisotropy of MR film 32 via a similar thermal annealing cycle. As precaution against reorientation of MR film 30's easy axis, one could reduce the time and/or temperature of the anneal of MR film 32 relative to that of MR film 30, or perform the anneal of MR film 32 in zero magnetic field.

Using means known in the art, the longitudinal magnetizations of MR elements 30 and 32 should be initially aligned, in conjunction with the direction of sense current and orientation of the induced easy-axes, in such manner that the transverse current fields $H_I$ will rotate both magnetization vectors $M_1$ and $M_2$ toward their nearest induced easy-axis. The resultant bias state will always be intrinsically self-stable. For the geometry shown in FIG. 3, $M_1$ and $M_2$ are initialized parallel to the sense current direction; in this specific example, all are in the +x direction.

Figure 4:
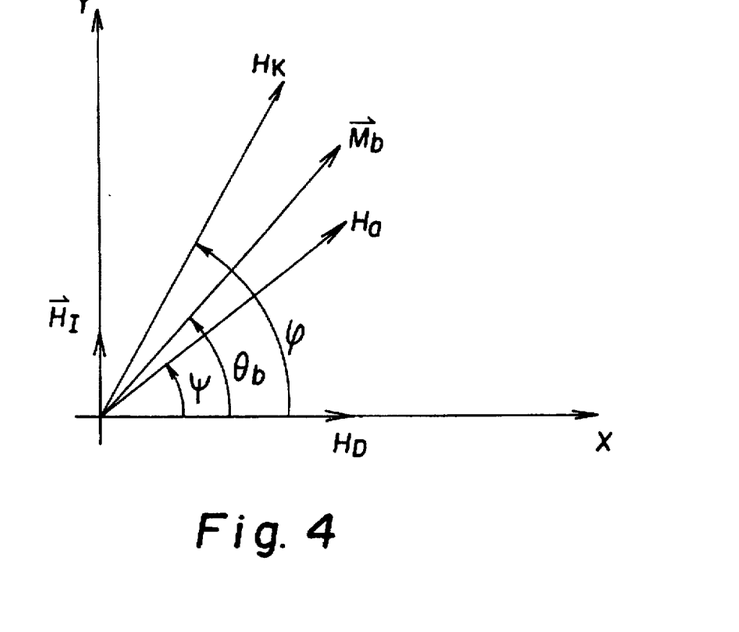
FIG. 4 is a graphical depiction of the magnetics of the self-biasing of a preferred embodiment of a PMR head according to the present invention.

FIG. 4 graphically illustrates the bias process for the specific embodiment in which the induced easy-axis misalignment is antisymmetrical, i.e., $\phi_1 = -\phi_2 = \phi$. Only the bias magnetization $M_{b1} = M_b$ is shown; results for $M_{b2}$ are identical except for a minus sign on all angles. Using known rules for the addition of noncolinear anisotropies, the net easy-axis is oriented at angle $\psi = \frac{1}{2}\tan^{-1}\{H_k\sin(2\phi)/(H_D + H_k\cos(2\phi)\}$, with net anisotropy field $H_a = H_D\cos(2\psi) + H_k\cos(2\phi - 2\psi)$. The equilibrium bias angle $\theta_b$ can be shown to satisfy the equation $H_a\sin(2\theta_b - 2\psi) = 2H_I\cos\theta_b$.

Figure 5:
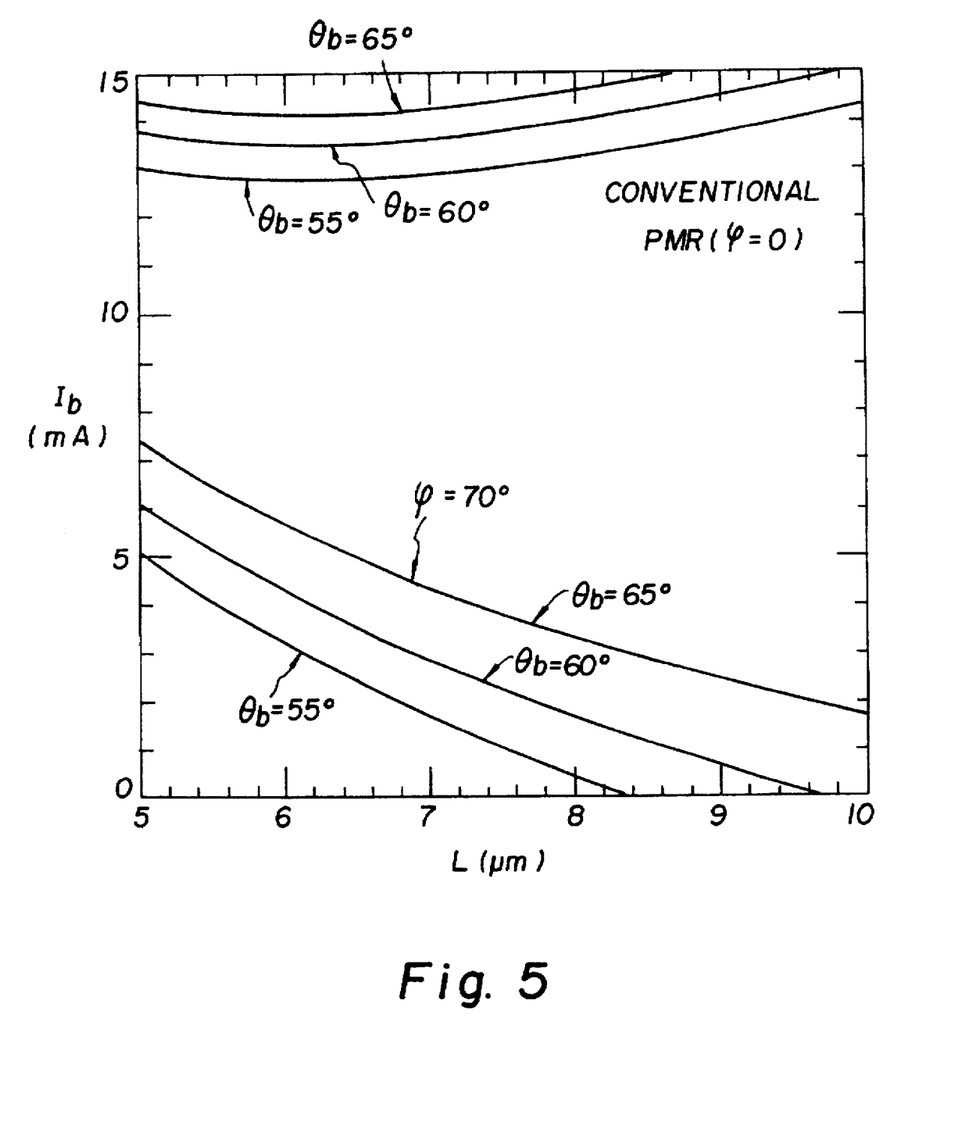
FIG. 5 is a graph of optimal bias current vs. MR element width, for both a conventional PMR and a preferred embodiment of a PMR according to the present invention.

Solutions of this equation, using previously cited parameter values, and expressed in terms of $I_b$ vs. L, are shown in FIG. 5 for the case $\phi = 70°$ and $55° \leq \theta_b \leq 65°$; the conventional PMR case ($\phi = 0$) is also shown for comparison. The range of $\theta_b$ reflects realistic (if not conservative) tolerances, in that to the extent $\theta_b = 60°$ is optimal, such minor variations in $\theta_b$ about 60° will to first order produce no change in PMR performance. As an example, FIG. 5 indicates for the antisymmetrical, $\phi = 70°$ embodiment of the present invention, that $\theta_b \approx 60°$ bias at $I_b \sim 3$ mA is achievable over a readily fabricatable tolerance of $L \sim 7 \pm 1$ µm, or, for fixed L=7 µm, $\theta_b \approx 60°$ bias is achievable over the flexible range $I_b = 3 \pm 1.5$ mA. For a W=1 mm trackwidth head, $R = \rho W/tL \sim 1330$ Ω, which for $I_b = 3$ mA only requires $V_b = \frac{1}{2}I_bR \sim 2$ V, within the range desired for low cost battery operation.

Figure 6A:
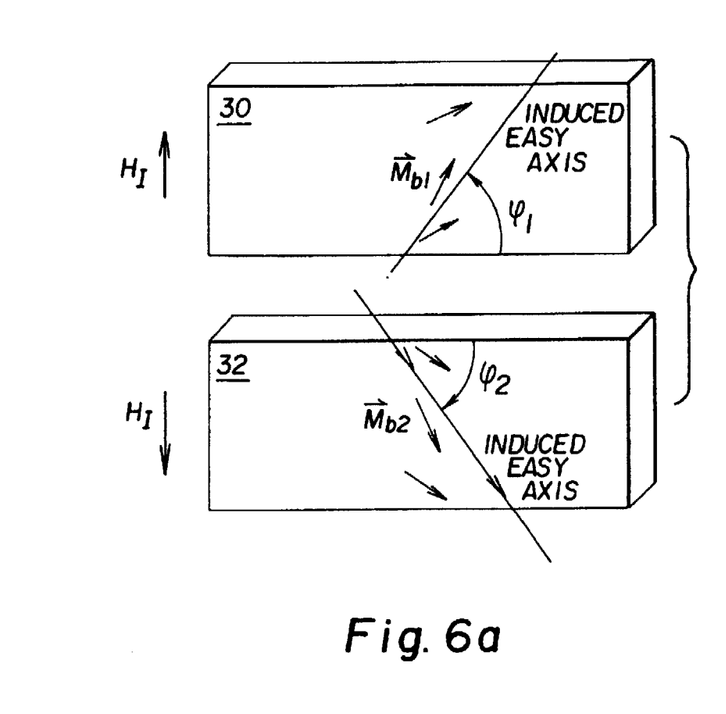
FIG. 6a and 6b are simplified pictorial representation of the magnetic state of the PMR head with zero signal field present, and with a large positive signal field present, respectively.
Figure 6B:
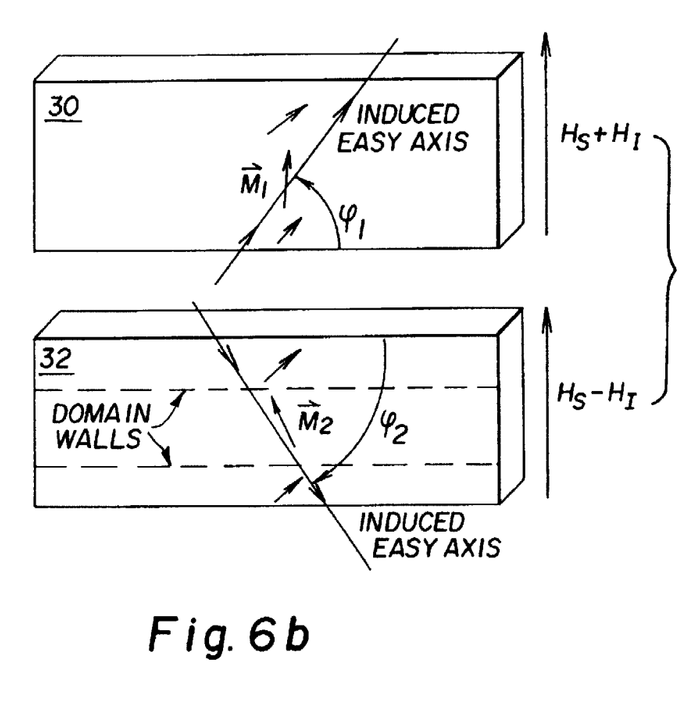

The antisymmetrical embodiment ($\phi_1 = -\phi_2 = \phi$) of the present invention is particularly well suited for applications where transverse signals fields, $H_r$, are sufficiently small such that the induced magnetization rotations $\Delta\theta = \theta - \theta_b$ never change the polarity of the transverse magnetization $M_y$ $\propto \sin\theta$ from that of the bias state. FIG. 6b depicts a situation when this is not the case, e.g., due to a transition in a sufficiently high moment recording medium passing directly underneath the PMR in which $H_s>>H_f$, $H_a$. The pictorializations of the magnetization states of the MR elements now more accurately reflects the variation in magnetization direction between central and edge regions through the element width. FIG. 6a depicts a bias state $H_s=0$. In FIG. 6b, a large, positive $H_s$ has rotated $\theta_2>0$ to a sufficient degree whereby MR element 32's longitudinal magnetization $M_{2x} \propto \cos(\theta_2)$ in the central element has switched polarity in order to more closely align with the nearest induced easy axis, creating a pair of low-angle domain walls.

Figure 8:
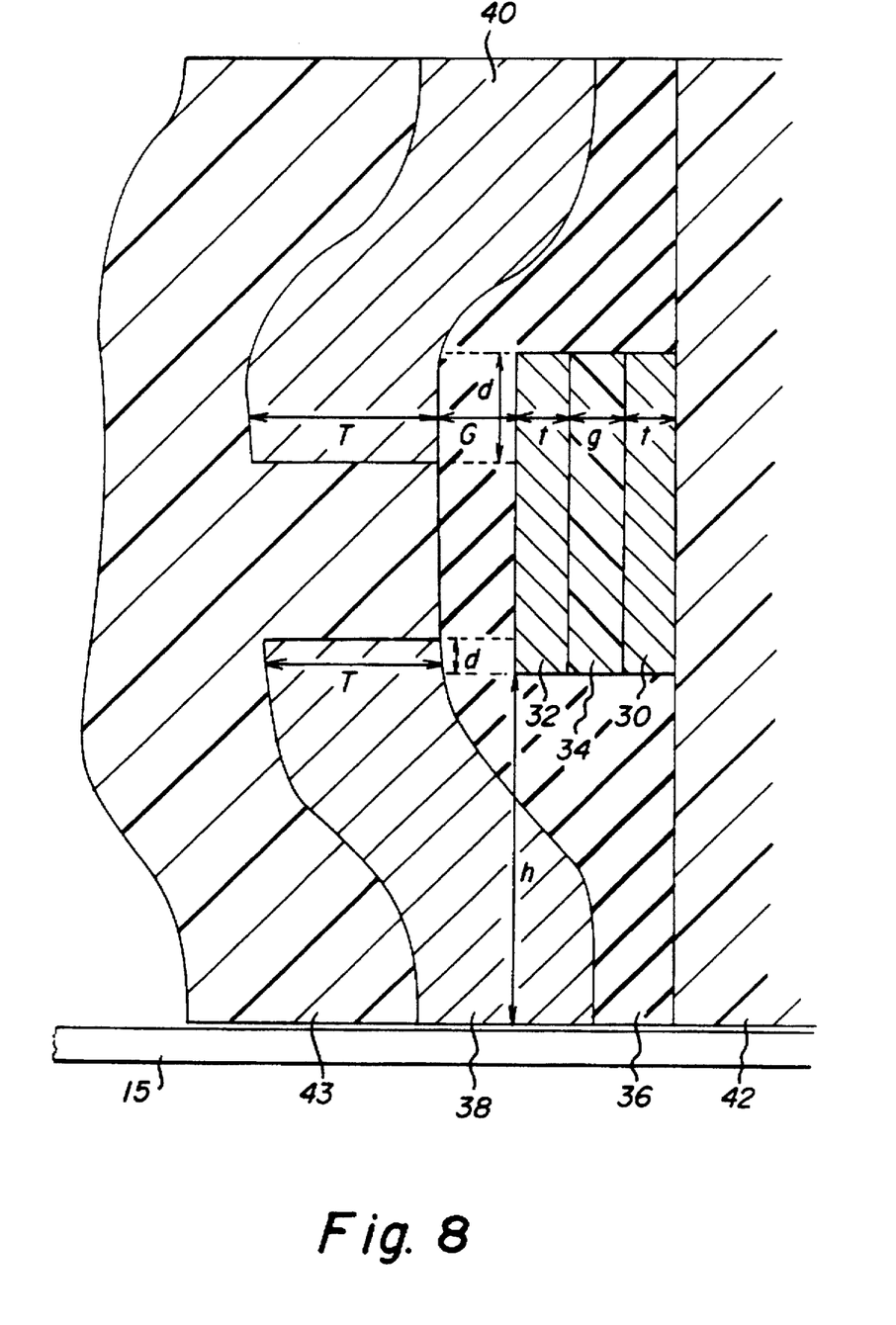
FIG. 8 is a sectional, elevational view of another embodiment of the invention.

As $H_s$ eventually diminishes, the return of MR element 32 back to its bias state ($\theta_2<0$) is now somewhat inhibited, since this requires the merging and annihilation of these domain walls, and the accompanying rotation of the central $M_2$ away from what is (temporarily) the nearest induced easy axis. This may possibly result in some degree of hysteresis. The latter would likely be increased when combining the present PMR invention with two high permeability flux guides (illustrated in FIG. 8), because the stabilizing magnetostatic interactions of the two domain walls with the flux-guides would tend to immobilize these domain walls in place. Removal of the less important, upper flux guide 40 would help alleviate this problem.

The aforementioned inhibition (relative to MR element 30) of the magnetization of MR element 32 to return to its bias state in the scenario of FIG. 6b will always be substantially exacerbated in a situation where $|H_{s2}|-|H_{s1}|>>H_f$. This can systematically occur with the present, low-$I_b$ (and hence low-$H_f$) PMR invention when combined with the flux-guides 38 and (optionally) 40 of FIG. 8. Deposited on top, the flux-guides are necessarily closer, and more strongly magnetically coupled to MR element 32 than MR element 30. The result, in effect, is that $|H_{s2}|>|H_{s1}|$. For this circumstance, the problem described in FIG. 6 can be mostly circumvented using an asymmetrically misaligned easy-axis PMR as presently taught, with $|\phi_2|<\phi_1\sim 90°$. The choice $\phi_1=90°$ maximizes the stability of MR element 30 to temporarily remain in the saturated state $\theta_1\sim 90°$ depicted in FIG. 6b, which in turn, via the strong, negative demagnetizing field from MR element 30 on MR element 32, helps promote the demagnetizing of MR element 32 toward the return to its bias state ($\theta_2<0$) as $H_s$ diminishes. The choice $\phi_1=90°$ also inhibits the aforementioned dual domain wall formation in MR element 30 in the opposite case of a large, negative $H_s$. PMR geometries which maximize $H_f \propto I_b/L$ within other design constraints would also be of general benefit for this purpose.

For the asymmetric case $\phi_2 \neq -\phi_1$, the strong magnetostatic coupling field $H_m \sim B_r t/L >> H_k$, $H_D$, $H_f$ between the two MR elements should contain the total transverse bias magnetization, $\propto \sin\theta_{b1}+\sin\theta_{b2}$, to approximately vanish, i.e., $\theta_{b2} \sim -\theta_{b1}$. In this case, one can show that the previous bias formulae for the antisymmetric case ($\phi_1=-\phi_2=\phi$) still hold, provided one takes $\phi=\frac{1}{2}(\phi_1+|\phi_2|)$ and $H_k \to H_k \cos(\frac{1}{2}(\phi_1-|\phi_2|))$. For example, the results of FIG. 5 also apply, to a good approximation, to the case $\phi_1=90°$, and $\phi_2=-50°$, a design applicable for solving the problem discussed in connection with FIG. 6.

Figure 7A:
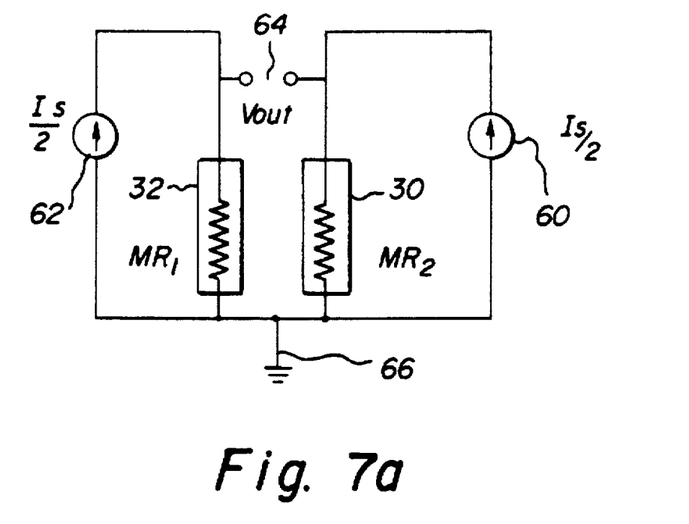
FIGS. 7a and 7b are schematic diagrams of detection schemes for the PMR of the present invention.
Figure 7B:
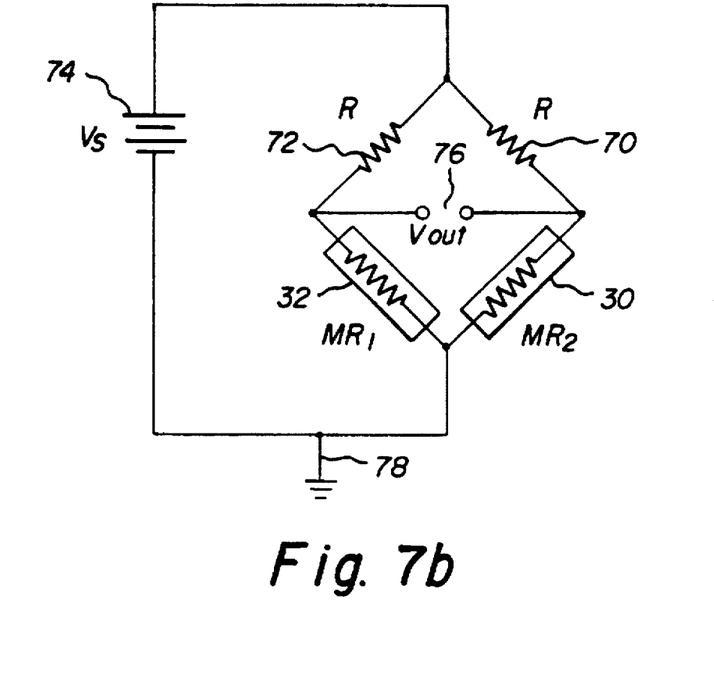

FIGS. 7a and 7b show simplified electrical circuit diagrams of two basic detection schemes for the PMR 28 of FIG. 3. FIG. 7a shows MR elements 30,32 driven by matched current sources 60,62, respectively. The differential output $V_{out}$ is measured at terminals 64. To the extent the elements are matched in their physical properties, this detection circuit will give essentially perfect cancellation of both even order harmonic distortion (assuming no magnetic saturation) and thermal-induced noise. The latter requires only matched temperature derivatives $dR_{30}/dT=dR_{32}/dT$. FIG. 7b shows a standard bridge circuit, including matched resistors 70,72, and dc voltage source 74. The differential output is measured at terminals 76. This circuit only provides the analogous cancellations to first order in the magnetically induced resistance change $\Delta R/R$. In particular, perfect thermal cancellation requires both $dR_{30}/dT=dR_{32}/dT$ and $R_{30}=R_{32}$. The latter is in general less likely due to various mismatching mechanisms (e.g., surface/grain boundary scattering, lead resistances) which, in addition to the magnetoresistance $\Delta R$ itself, are relatively temperature insensitive and thereby do not contribute as much to mismatch in $dR/dT$. However, given the smallness of $\Delta R/R$, and the inevitable mismatches in real devices and electronic components, the very simple bridge circuit should suffice for most, if not all, applications.

Although the invention has been described with reference to preferred embodiments thereof, it will be appreciated that variations and modifications can be effected within the spirit and scope of the invention.

What is claimed is:

1. A magnetoresistive head assembly comprising:

a paired magnetoresistive head including first and second magnetoresistive elements, and having a first electrically insulating spacer located between said elements;

said first and second magnetoresistive elements being of nominally identical thickness, geometry, magnetic and electrical properties, with the exception that easy-axis of uniaxial anisotropy (excluding shape anisotropy) of said first MR element, is oriented at a first, substantially nonzero angle with respect to the geometrically defined longitudinal axis of said MR elements, and is substantially nonparallel to the easy-axis of uniaxial anisotropy (excluding shape anisotropy) of said second MR element, said easy-axis of uniaxial anisotropy of said second MR element being oriented at a second, substantially nonzero angle with respect to the geometrically defined longitudinal axis of said MR elements;

means for making electrical contact to, and supplying a parallel bias current of nominally equal amplitude through both of said MR elements; and means for sensing the difference in voltage across said first and second MR elements.

2. The magnetic head assembly of claim 1, which additionally includes:

a magnetic flux guide of a high magnetically permeable material, said magnetic flux guide having a first edge located proximate to a magnetic medium and a second edge spaced from said first edge and said magnetic medium; and a second electrically insulating spacer located between said second edge of said flux guide and said paired magnetoresistive head;

wherein said paired magnetoresistive head is spaced from said magnetic medium and wherein said magnetic flux guide conducts magnetic flux from said magnetic medium to and through said paired magnetoresistive head.

* * * * *